(12) United States Patent
Kobayashi et al.

(10) Patent No.: US 8,045,293 B2
(45) Date of Patent: Oct. 25, 2011

(54) THIN FILM MAGNETIC HEAD INCLUDING THERMAL DEFORMATION-PREVENTING LAYER

(75) Inventors: Kiyoshi Kobayashi, Niigata-ken (JP); Sumihito Morita, Niigata-ken (JP); Tomoo Otsuka, Niigata-ken (JP); Hironori Namba, Niigata-ken (JP)

(73) Assignee: TDK Corporation, Tokyo (JP)

( * ) Notice: Subject to any disclaimer, the term of this patent is extended or adjusted under 35 U.S.C. 154(b) by 957 days.

(21) Appl. No.: 11/851,692

(22) Filed: Sep. 7, 2007

(65) Prior Publication Data

US 2008/0068762 A1    Mar. 20, 2008

(30) Foreign Application Priority Data

Sep. 20, 2006  (JP) .................................. 2006-253714

(51) Int. Cl.
*G11B 5/31* (2006.01)
*G11B 5/60* (2006.01)
*G11B 21/21* (2006.01)

(52) U.S. Cl. ........................................ 360/128; 360/317

(58) Field of Classification Search ............. 360/125.32, 360/125.31, 125.3, 125.75, 125.74, 119.08, 360/234.7, 317, 128, 313
See application file for complete search history.

(56) References Cited

U.S. PATENT DOCUMENTS

| | | | |
|---|---|---|---|
| 6,275,354 B1 * | 8/2001 | Huai et al. ................ 360/123.61 |
| 6,400,525 B1 * | 6/2002 | Sasaki et al. ................ 360/123.5 |
| 6,737,281 B1 * | 5/2004 | Dang et al. ......................... 438/3 |
| 6,760,191 B1 * | 7/2004 | Yan et al. ....................... 360/128 |
| 6,842,308 B1 | 1/2005 | Pust et al. |
| 6,914,750 B2 * | 7/2005 | Garfunkel et al. ......... 360/234.3 |
| 6,950,280 B2 * | 9/2005 | Rea et al. ................. 360/125.31 |
| 7,102,855 B2 * | 9/2006 | Tabakovic et al. ......... 360/234.5 |
| 2004/0109262 A1 * | 6/2004 | Maruyama et al. ........ 360/234.7 |
| 2004/0130820 A1 * | 7/2004 | Ota ................................ 360/128 |
| 2005/0047015 A1 * | 3/2005 | Matono et al. ................ 360/126 |
| 2005/0219749 A1 * | 10/2005 | Aoki et al. ..................... 360/126 |
| 2005/0270694 A1 * | 12/2005 | Umehara et al. .............. 360/126 |
| 2006/0209464 A1 * | 9/2006 | Kurita et al. ............... 360/235.1 |

FOREIGN PATENT DOCUMENTS

| | | |
|---|---|---|
| JP | 2004-303320 | 10/2004 |
| JP | 2005-285236 | 10/2005 |

OTHER PUBLICATIONS

Office Action issued in corresponding Japanese Patent Application No. P2006-253714, mailed Jul. 8, 2008.

* cited by examiner

*Primary Examiner* — Daniell L Negron
*Assistant Examiner* — Tamara Ashford
(74) *Attorney, Agent, or Firm* — Brinks Hofer Gilson & Lione

(57) ABSTRACT

A thin film magnetic head includes a recording and playback element, a lead conductor layer for feeding a power to the recording and playback element, an electrically conductive bump for conductively connecting the lead conductor layer to an electrode pad for external connection, and an insulating protective layer filling between the recording and playback element and the electrically conductive bump. A thermal deformation-preventing layer composed of a material having a thermal expansion coefficient smaller than that of the insulating protective layer is disposed in the insulating protective layer in such a way as to locate between a medium-facing surface and the electrically conductive bump without being exposed at the medium-facing surface. In the resulting thin film magnetic head, protrusion of the recording and playback element toward the recording medium side can be prevented without changing the configuration of the recording and playback element nor the forming material.

6 Claims, 7 Drawing Sheets

THIN FILM MAGNETIC HEAD INCLUDING THERMAL DEFORMATION-PREVENTING LAYER

CLAIM OF PRIORITY

This application claims benefit of the Japanese Patent Application No. 2006-253714 filed on Sep. 20, 2006, which is hereby incorporated by reference.

BACKGROUND

1. Field of the Invention

The present invention relates to a thin film magnetic head provided with an electrically conductive bump for conductively connecting a lead conductor layer connected to a recording and playback element and an electrode pad for external connection.

2. Description of the Related Art

A thin film magnetic head is provided with a recording and playback element that reads magnetic recording information from a recording medium through the use of magnetoresistance effect and records magnetic information by applying a recording magnetic field to the recording medium. The recording and playback element includes a lower shield layer and an upper shield layer opposed to each other with a predetermined distance therebetween on a medium-facing surface. A multilayer film is disposed between the upper and lower shield layers so as to exert a magnetoresistance effect. A pair of magnetic core layers are opposed to each other with a magnetic gap layer therebetween on the medium-facing surface. A recording coil layer induces a recording magnetic field in the magnetic core layer, and the like. The recording and playback operation is performed by energization of the multilayer film and the recording coil layer through the lead conductor layer. Each of the multilayer film and the recording coil layer is provided with one pair of lead conductor layers. One end portion of the lead conductor layer is connected to the multilayer film or the recording coil layer, and the other end portion is extended to the back side in the height direction as compared with the recording and playback element so as to be connected to an external connection electrode pad through an electrically conductive bump. An insulating protective layer is disposed around the electrically conductive bump.

With respect to the above-described thin film magnetic head having the known structure, it is known that the temperature of the recording and playback element and the periphery thereof (in particular, the temperature around the coil layer) is increased during the recording and playback operation, and the recording and playback element is thermally expanded by this temperature increase so as to protrude toward the recording medium side. Furthermore, it is known that a temperature increase in an environment surrounding the thin film magnetic head also affects the protrusion of the recording and playback element toward the recording medium side. In recent years, the recording density has been increased and, thereby, the opposition distance between the recording medium and the thin film magnetic head is reduced. Consequently, a problem exist in that the recording and playback element that protrudes toward the recording medium side comes into contact with the recording medium, and the recording medium is damaged or the recording and playback element itself is damaged. In order to prevent the thermal expansion of the recording and playback element, it may be thought that the recording and playback element is formed by using a material having a small thermal expansion coefficient than ever. However, it is difficult to change the material without changing the element characteristics (see for example, to U.S. Pat. No. 6,842,308 B1 and Japanese Unexamined Patent Application Publication No. 2004-303320).

SUMMARY

The present invention provides a thin film magnetic head in which protrusion of a recording and playback element toward the recording medium side can be prevented without changing the configuration of the recording and playback element nor the forming material.

It was found that an electrically conductive bump was also thermally expanded due to a temperature increase in the recording and playback operation and an environmental temperature, the amount of thermal expansion of the electrically conductive bump was large because the volume of the electrically conductive bump was very large and, thereby, the amount of protrusion of the recording and playback element toward the recording medium side was increased.

A thin film magnetic head according to one aspect is provided with a recording and playback element, a lead conductor layer for feeding a power to the recording and playback element, an electrically conductive bump, which is disposed on a back-side end portion in the height direction of the lead conductor layer and which conductively connects the lead conductor layer to an electrode pad for external connection. An insulating protective layer covers the recording and playback element and the lead conductor layer so as to fill between the recording and playback element and the electrically conductive bump. A thermal deformation-preventing layer, composed of a material having a thermal expansion coefficient smaller than the thermal expansion coefficient of the insulating protective layer, is disposed in the insulating protective layer in such a way as to locate between a surface facing a recording medium and the electrically conductive bump without being exposed at the medium-facing surface.

The thermal deformation-preventing layer is hard to thermally deform due to temperature variation as compared with the insulating protective layer, and has the property of preventing the insulating protective layer from being deformed under the influence of thermal expansion of the electrically conductive bump. Therefore, even when the electrically conductive bump is thermally expanded due to a temperature increase, the amount of expansion of the insulating protective layer based on the thermal expansion is decreased, and the influence of the thermal expansion of the electrically conductive bump located on the back side in the height direction is not exerted on the recording and playback element located on the medium-facing surface side. That is, protrusion of the recording and playback element due to the influence of the thermal expansion of the electrically conductive bump does not occur. Consequently, protrusion of the recording and playback element toward the recording medium side is prevented, and the contact with the recording medium can be avoided. Furthermore, since the thermal deformation-preventing layer is not exposed at the medium-facing surface, no problem occurs in polishing for forming the medium-facing surface.

It is preferable that the thermal deformation-preventing layer is not in contact with the electrically conductive bump. It is estimated that when the thermal deformation-preventing layer is in contact with the electrically conductive bump, the thermal expansion of the electrically conductive bump can also be prevented. However, a problem occurs in that since the working rates are different between the insulating protective layer and the thermal deformation-preventing layer in the polishing performed before the electrode pad is formed on the electrically conductive bump, unevenness occurs in the vicinity of the interface between the insulating protective layer and the thermal deformation-preventing layer, and the formation of the electrode pad becomes difficult. When the thermal deformation-preventing layer is not in contact with the electrically conductive bump, the thermal deformation-preventing layer is not exposed at the polishing surface, so that the electrode pad can be formed on the electrically conductive bump easily.

Since the thermal deformation-preventing layer has at least the property of preventing the insulating protective layer from being thermally deformed, the recording and playback element is not affected by the thermal expansion of the electrically conductive bump and, therefore, the amount of protrusion toward the recording medium side is decreased. Consequently, a thin film magnetic head can be obtained, in which protrusion of a recording and playback element toward the recording medium side can be prevented without changing the configuration of the recording and playback element nor the forming material.

DESCRIPTION OF THE EMBODIMENTS

The present invention will be described below with reference to the drawings. In each drawing, the X direction is defined as a track width direction, the Y direction is defined as height direction, and the Z direction is defined as a lamination direction of each layer constituting the thin film magnetic head and a movement direction of the recording medium.

Figure 1:
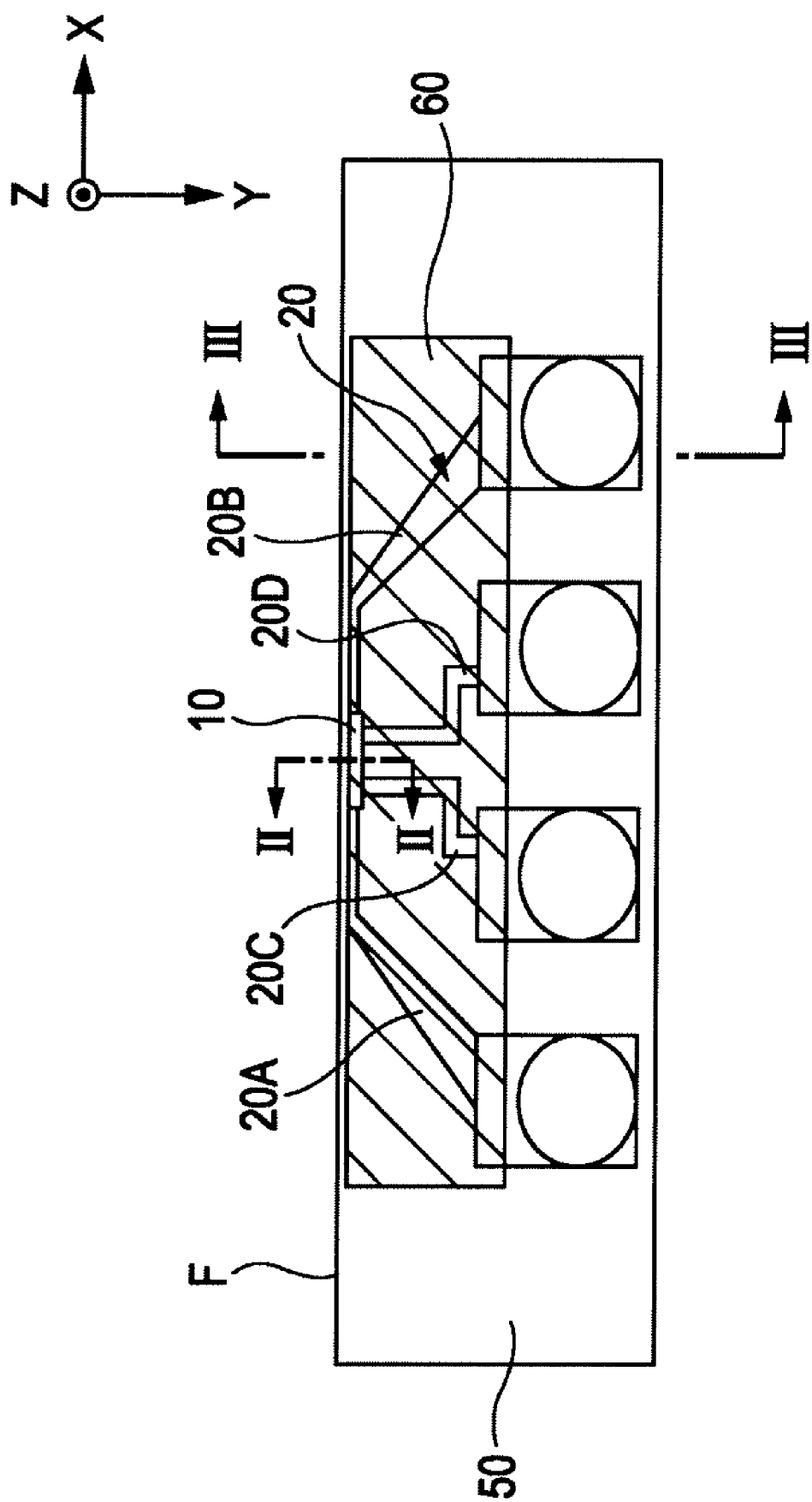
FIG. 1 is a plan view showing the entire configuration of a thin film magnetic head according to an embodiment, viewed from an upper surface.

FIG. 1 is a schematic plan view showing a thin film magnetic head H according to an embodiment, viewed from an upper surface. The present thin film magnetic head H is a thin film magnetic head of perpendicular recording system. This thin film magnetic head H is provided with a recording and playback element 10 exposed at a surface (medium-facing surface) F facing a recording medium, a lead conductor layer 20 for feeding a power to the recording and playback element 10, an electrically conductive bump 30 located on an end portion of the lead conductor layer 20 opposite to the side connected to the recording and playback element 10, an external connection electrode pad 40 conductively connected to the lead conductor layer 20 through the electrically conductive bump 30, and an insulating protective layer 50 for filling the periphery of the electrically conductive bump 30.

Figure 2:
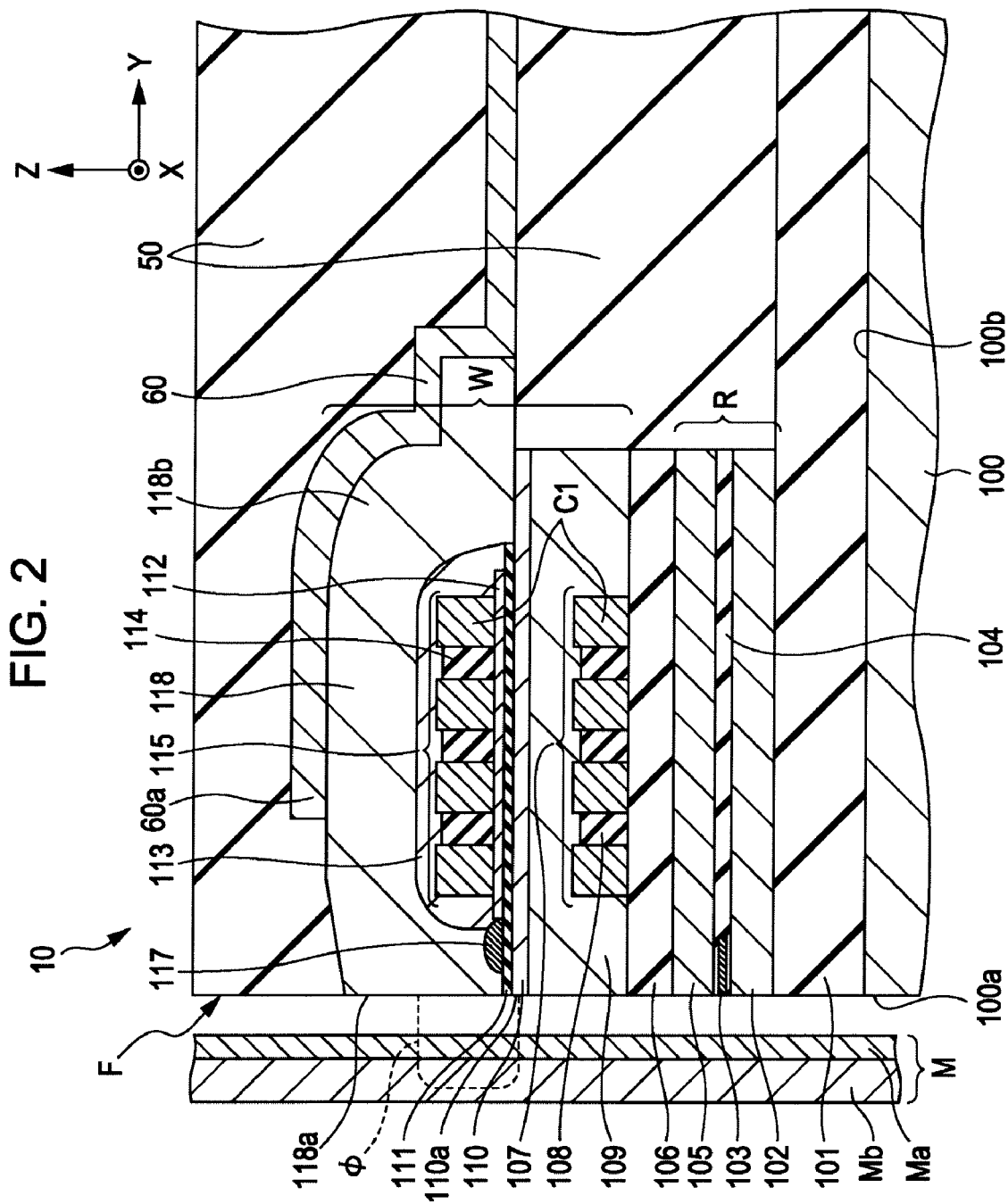
FIG. 2 is a sectional view of a section taken along a line II-II shown in FIG. 1, showing the laminated structure of the recording and playback element.

FIG. 2 is a sectional view showing the laminated structure of the recording and playback element 10. A thin film of the recording and playback element 10 is disposed on a tailing-side end surface 100b of a slider 100, and includes a playback portion R and a recording portion W. The playback portion R reads magnetic information from a recording medium M through the use of a magnetoresistance effect, and the recording portion W applies a perpendicular magnetic field $\Phi$ to the recording medium M so as to magnetize a hard film Ma of the recording medium M in a perpendicular direction and perform a recording operation.

The recording medium M includes the hard film Ma having high residual magnetization on a medium surface side and a soft film Mb having a high permeability in a side inner than is the hard film Mb. This recording medium M is in the shape of, for example, a disk, and is allowed to rotate while the center of the disk serves as a center of the rotation axis. The slider 100 is formed from a nonmagnetic material, e.g., $Al_2O_3$.TiC. A medium-facing surface 100a of the slider 100 is opposed to the recording medium M, and when the recording medium M is rotated, the slider 100 flies from the surface of the recording medium M by an air stream on the surface.

A protective layer 101 is disposed from a nonmagnetic insulating material, e.g., $Al_2O_3$ or $SiO_2$, on the trailing-side end surface 100b of the slider 100, and the playback portion R is disposed on this protective layer 101. The playback portion R includes a lower shield layer 102, an upper shield layer 105, a gap insulating layer 104 filling between the lower shield layer 102 and the upper shield layer 105, and a multilayer film 103 located in the gap insulating layer 104. The multilayer film 103 is a magnetoresistive film, e.g., an AMR, a GMR, or a TMR.

A recording portion W is laminated on the upper shield layer 105. The recording portion W includes a plurality of lower coils 107 disposed on the upper shield layer 105 with a coil insulating layer 106 therebetween, a main magnetic pole layer (magnetic core layer) 110, a magnetic gap layer 113, a plurality of upper coils 115 disposed on the magnetic gap layer 113 with a coil insulating layer 114 therebetween, and a return yoke layer (magnetic core layer) 118.

The lower coil 107 is formed from at least one nonmagnetic metal material selected from, for example, Au, Ag, Pt, Cu, Cr, Al, Ti, NiP, Mo, Pd, Rh, and Ni. Alternatively, the lower coil 107 may have a laminated structure in which these nonmagnetic metal materials are laminated. A lower coil insulating layer 108 is disposed around the lower coil 107.

The main magnetic pole layer 110 and an auxiliary yoke layer 109 magnetically connected to the main magnetic pole layer 110 are disposed on the lower coil insulating layer 108. The auxiliary yoke layer 109 is disposed directly below the main magnetic pole layer 110, from a magnetic material having a saturation magnetic flux density lower than that of the main magnetic pole layer 110, and magnetically functions as a part of the main magnetic pole layer 110. The upper surfaces of the auxiliary yoke layer 109 and the lower coil insulating layer 108 are flattened, a seed layer is disposed on the flat surface, and the main magnetic pole layer 110 is disposed on the seed layer. The main magnetic pole layer 110 has a predetermined length from the medium-facing surface F in the Y direction shown in the drawing and, in addition, the dimension in the X direction shown in the drawing of a front end surface 110a exposed at the medium-facing surface F is specified to be a recording track width Tw. The main magnetic pole layer 110 is formed from a ferromagnetic material, e.g., Ni—Fe, Co—Fe, or Ni—Fe—Co, having a high saturation magnetic flux density by plating.

The magnetic gap layer 113 is disposed on an insulating material layer 111 that fills the main magnetic pole layer 110 and the periphery thereof (both sides of the main magnetic pole layer 110 in the X direction shown in the drawing and the back in the Y direction shown in the drawing). A throat height-determination layer 117 is disposed from an inorganic or organic material at a location a predetermined distance from the medium-facing surface F on the magnetic gap layer 113. The throat height of the thin film magnetic head H is specified by the distance from the medium-facing surface F to the front end edge of the throat height-determination layer 117.

Similarly to the lower coil 107, the upper coil 115 is formed from at least one nonmagnetic metal material selected from, for example, Au, Ag, Pt, Cu, Cr, Al, Ti, NiP, Mo, Pd, Rh, and Ni. Alternatively, the upper coil 115 may have a laminated structure in which these nonmagnetic metal materials are laminated. An upper coil insulating layer 114 is disposed around the upper coil 115.

End portions in the X direction shown in the drawing of the above-described lower coil 107 and the upper coil 115 are electrically connected to each other so as to take on a solenoidal shape and function as an integrated recording coil layer. The shape of the recording coil layer is not specifically limited to the solenoidal shape, and may be a spiral shape, in which the coil is wound around a connection portion between the main magnetic pole layer 110 and the return yoke layer 118.

The return yoke layer 118 is disposed from a ferromagnetic material, e.g., permalloy, over the upper coil insulating layer 114 and the magnetic gap layer 113. This return yoke layer 118 includes the front end surface 118$a$ exposed at the medium-facing surface F, and is opposed to the main magnetic pole layer 110 with a gap distance therebetween on the medium-facing surface F. A rear end portion of the return yoke layer 118 in the height direction is a connection portion 118$b$ connected to the main magnetic pole layer 110. The return yoke layer 118 is covered with an insulating protective layer 50.

As shown in FIG. 1, the lead conductor layer 20 includes a pair of playback-side lead conductor layers 20A and 20B connected to the two end portions in the track width direction of the multilayer film 103, a pair of recording-side lead conductor layers 20C and 20D connected to the two end portions of the recording coil layer composed of the lower coil 107 and the upper coil 115. Each lead conductor layer 20 is formed from a low-resistance electrically conductive material, e.g., Cu or Au. An electrically conductive bump 30 is disposed on an end portion of the lead conductor 20, opposite to the side connected to the recording and playback element 10.

Figure 3:
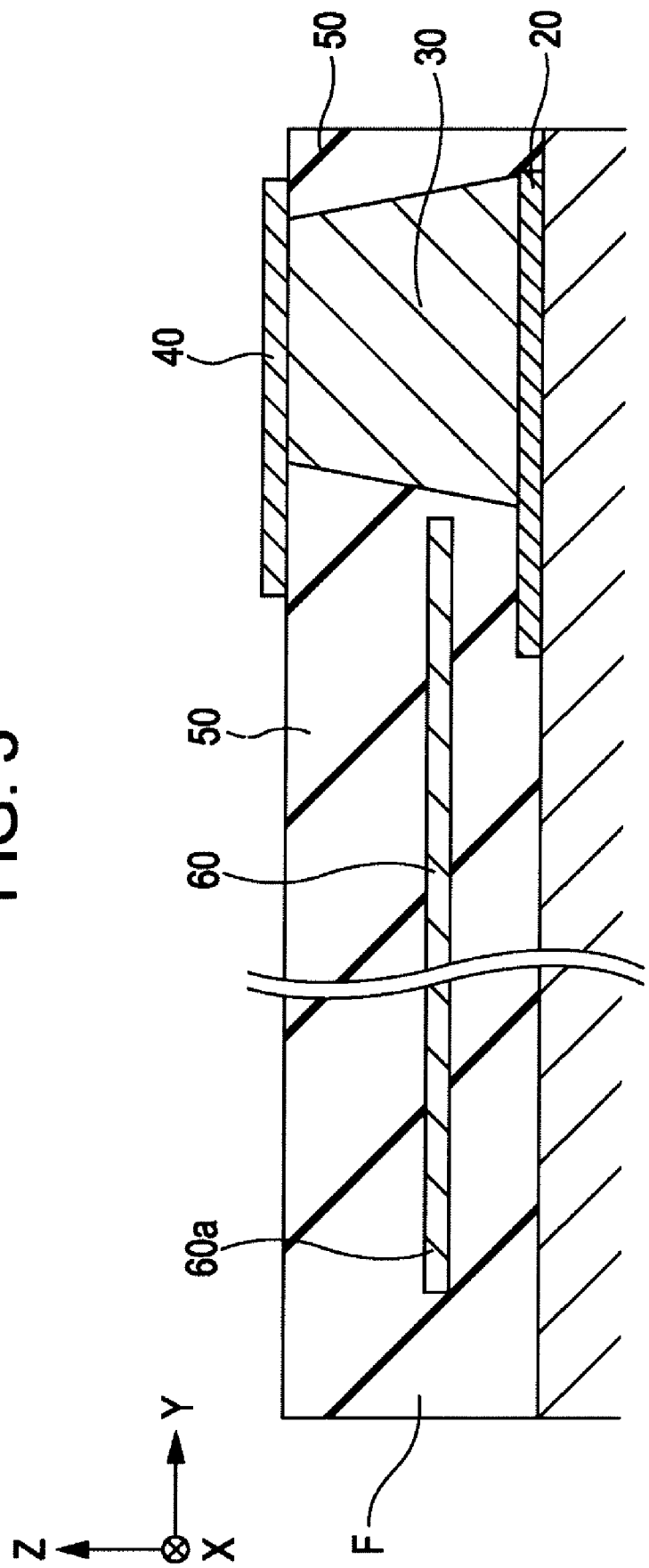
FIG. 3 is a sectional view of a section taken along a line III-III shown in FIG. 1, showing the laminated structure in the vicinity of an electrically conductive bump.

FIG. 3 is a sectional view showing the laminated structure in the vicinity of the electrically conductive bump 30. The electrically conductive bump 30 disposed on the lead conductor layer 20 is formed from an electrically conductive material, e.g., Ni, Cu, or Au, and has a very large volume as compared with the volumes of the recording and playback element 10 and the lead conductor layer 20 in order to reduce the current loss. The insulating protective layer 50, which covers the upper surface and the rear portion in the height direction of the recording and playback element 10 and the lead conductor layer 20 and which fills the periphery of the electrically conductive bump 30, is disposed around the electrically conductive bump 30. The insulating protective layer 50 is disposed by forming an $Al_2O_3$ film having a thickness adequate for entirely covering the electrically conductive bump 30 and, thereafter, flattening the upper surface of the resulting $Al_2O_3$ film by, for example, polishing so as to expose the surface of the electrically conductive bump 30. A rectangular electrode pad 40 is disposed on the insulating protective layer 50 and the electrically conductive bump 30 in such a way as to entirely cover the upper surface of the electrically conductive bump 30. The electrode pad 40 is formed from an electrically conductive material, e.g., Au.

Furthermore, as shown in FIG. 1 to FIG. 3, in the insulating protective layer 50 of the thin film magnetic head H having the above-described entire configuration, a thermal deformation-preventing layer 60 is disposed from a material having a thermal expansion coefficient smaller than the thermal expansion coefficient of the constituent material of the insulating protective layer 50 and the recording and playback element 10, specifically, any one of $SiO_2$, $ZrO_2$, and SiC. The thermal deformation-preventing layer 60 of the present embodiment is formed from $SiO_2$. The thermal deformation-preventing layer 60 is in the shape of a rectangle extending in the arrangement direction of the electrically conductive bump 30, and is disposed along the upper surface of the return yoke layer 118, from the position of a layer above the recording and playback element 10 (return yoke layer 118) to the position close to the electrically conductive bump 30.

The thermal deformation-preventing layer 60 is hard to be thermally deformed due to a temperature change as compared with the insulating protective layer 50 because the thermal expansion coefficients are different, and has the property of preventing the insulating protective layer 50 and the recording and playback element 10 from being deformed together with the electrically conductive bump 30 when the electrically conductive bump 30 is thermally deformed (thermally expanded). Consequently, even when the electrically conductive bump 30 is thermally expanded by an increase in temperature, the thermal expansion is reduced, and an influence of the thermal expansion of the electrically conductive bump 30 located on the back side in the height direction does not reach the recording and playback element 10 located on the medium-facing surface side. That is, no protrusion of the recording and playback element occurs under the influence of the thermal expansion of the electrically conductive bump 30. In this manner, protrusion of the recording and playback element 10 toward the recording medium M side is prevented, and contact with the recording medium M can be avoided.

As the thickness of the thermal deformation-preventing layer 60 is increased, the property of preventing deformation of the insulating protective layer 50 (and the recording and playback element 10) is enhanced. It is preferable that the thickness of the thermal deformation-preventing layer 60 is set appropriately in accordance with the amount of protrusion of the recording and playback element 10 toward the recording medium M side.

An end portion 60$a$ on the medium-facing surface F side of the thermal deformation-preventing layer 60 is retreated from the medium-facing surface F in the height direction by a predetermined distance, and is not exposed at the medium-facing surface F (FIG. 2). Since the thermal deformation-preventing layer 60 is not exposed at the medium-facing surface F, it is possible to avoid a problem in that the working rate in polishing for forming the medium-facing surface F of the thermal deformation-preventing layer 60 is different from the working rate of the insulating protective layer 50, unevenness occurs in the vicinity of a boundary between the thermal deformation-preventing layer 60 and the insulating protective layer 50 and, thereby, formation of flat medium-facing surface F becomes difficult.

Furthermore, the thermal deformation-preventing layer 60 is not in contact with the electrically conductive bump 30. Since the thermal deformation-preventing layer 60 is not in contact with the electrically conductive bump 30, it is possible to avoid a problem in that the working rate of the thermal deformation-preventing layer 60 in the polishing of the insulating protective layer 50 to expose the upper surface of the electrically conductive bump 30 is different from the working rate of the insulating protective layer 50, unevenness occurs in the vicinity of a boundary between the thermal deformation-preventing layer 60 and the insulating protective layer 50 and, thereby, formation of the electrode pad 40 becomes difficult.

Figure 4:
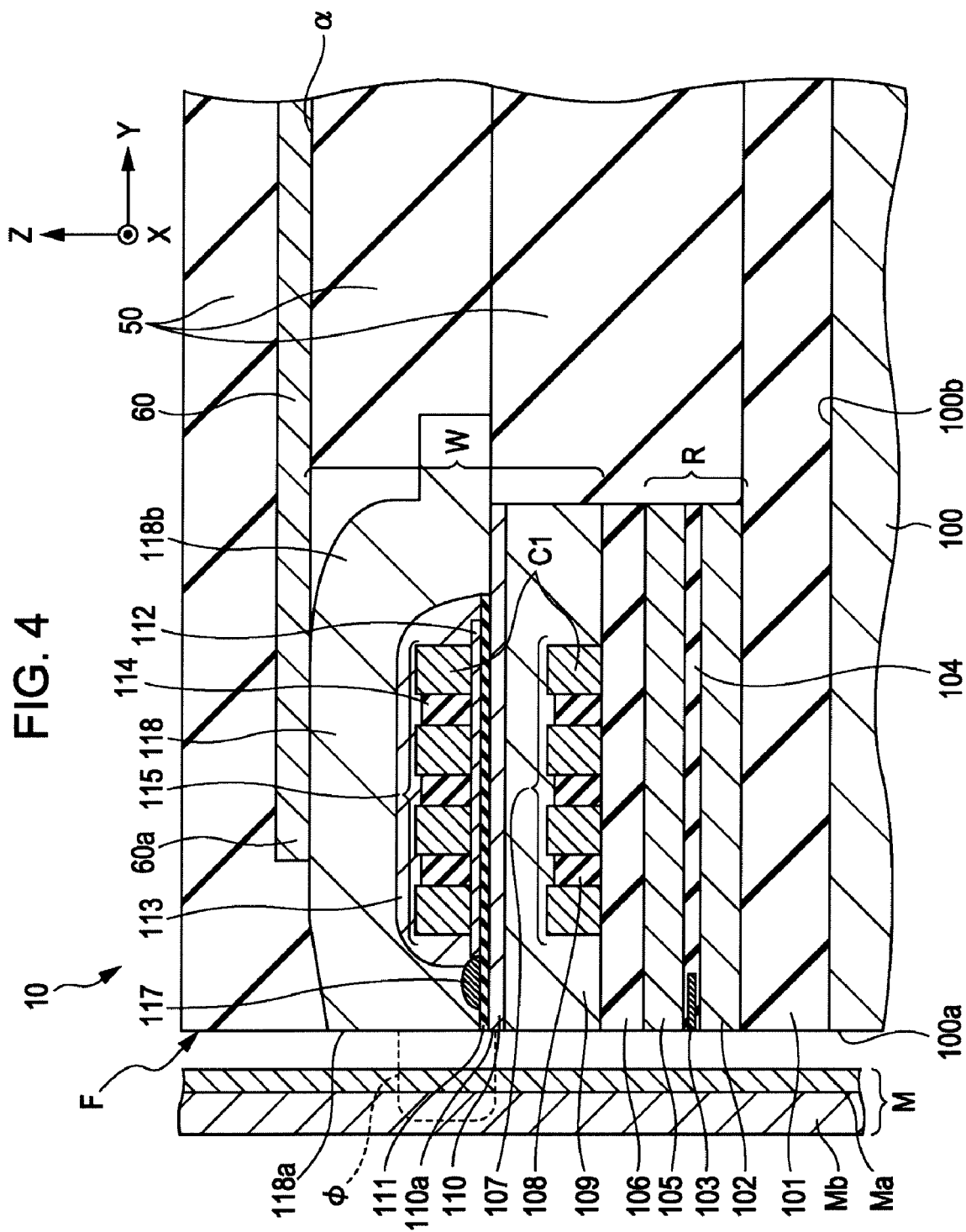
FIG. 4 is a sectional view showing a state in which a thermal deformation-preventing layer is disposed on a flat surface composed of a return yoke layer and an insulating protective layer.
Figure 5:
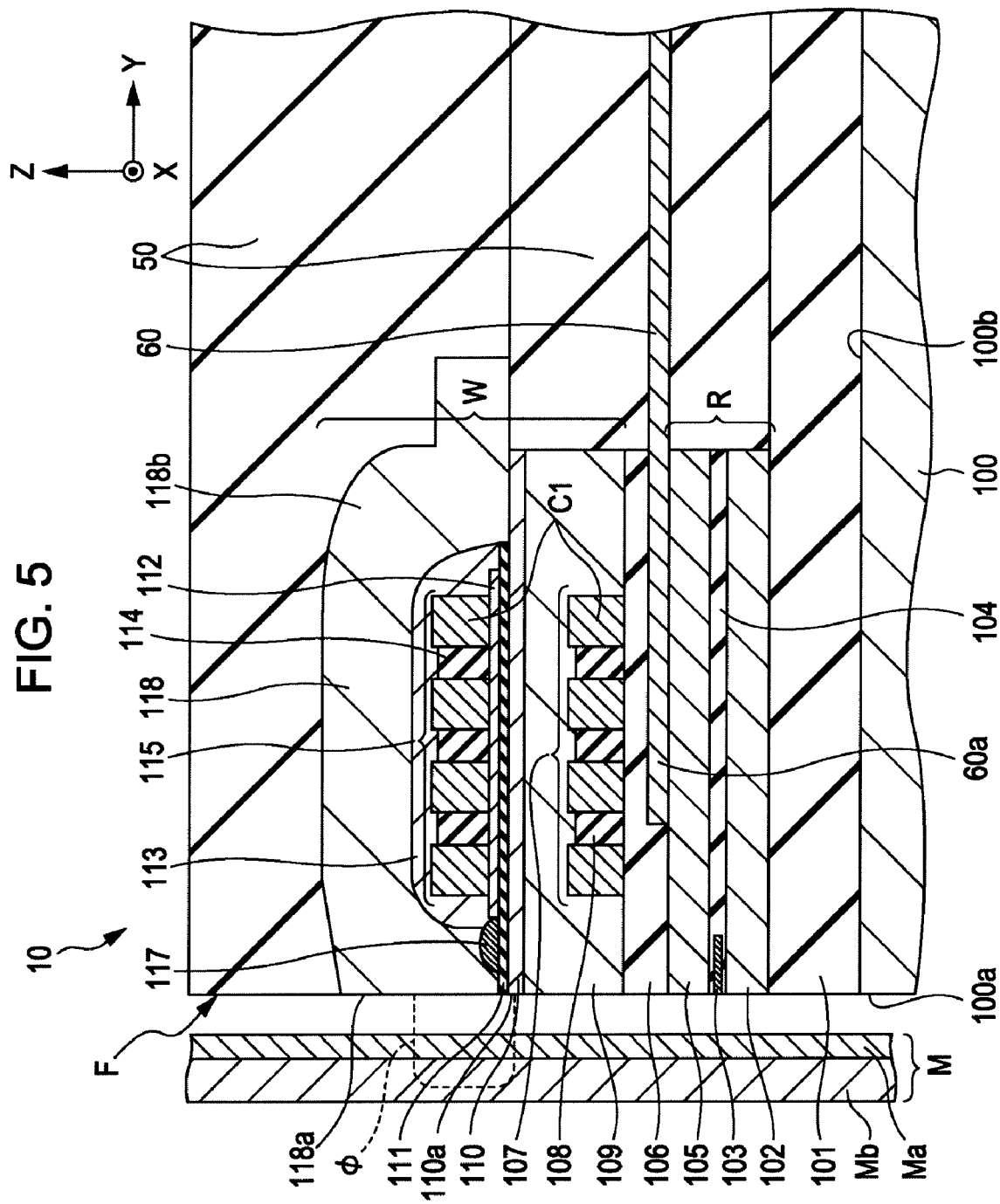
FIG. 5 is a sectional view showing a state in which a thermal deformation-preventing layer is disposed while being interposed between an upper shield layer and a coil insulating layer.
Figure 6:
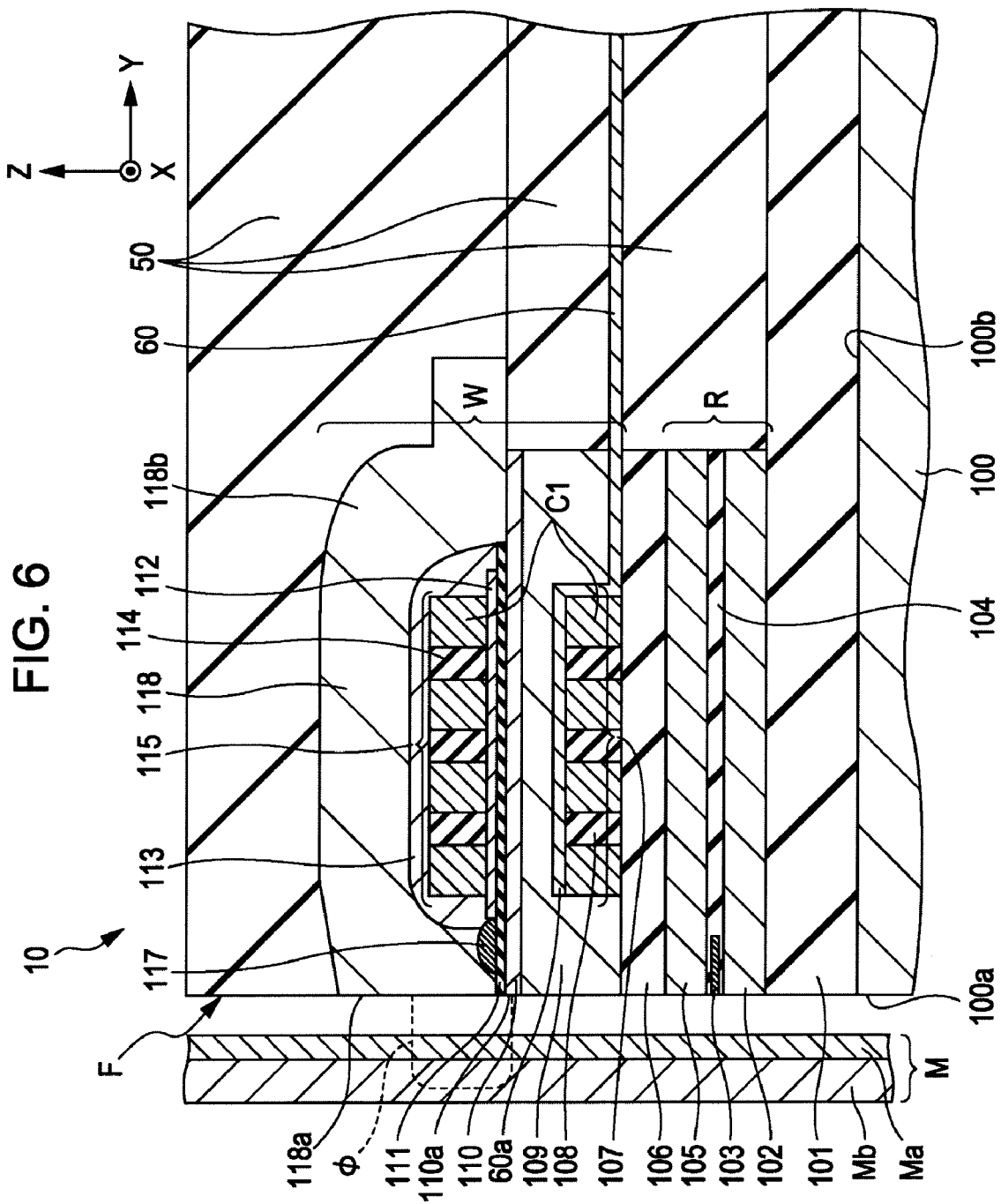
FIG. 6 is a sectional view showing a state in which a thermal deformation-preventing layer is disposed on a recording coil.

In the present embodiment, as described above, the thermal deformation-preventing layer 60 is disposed along the upper surface of the return yoke layer 118. However, the position of the layer, at which the thermal deformation-preventing layer 60 is disposed, can be changed appropriately. Another form of the position of the layer, at which the thermal deformation-preventing layer 60 is disposed, is as shown in FIG. 4, for example. The upper surface of the return yoke layer 118 is flattened by the insulating protective layer 50, and a film (rectangular section) having a uniform thickness is disposed on the resulting flat surface α. Alternatively, as shown in FIG. 5, a film (rectangular section) having a uniform thickness may be disposed interposing between the upper shield layer 105 and the coil insulating layer 106. Alternatively, as shown in FIG. 6, a film having a uniform thickness may be disposed on the recording coil (in the embodiment shown in the drawing, the lower coil 107 of the solenoidal coil) along the recording coil upper surface. When the thermal deformation-preventing layer 60 is present on the recording coil, thermal expansion of each coil line of the recording coil can be prevented. The thermal deformation-preventing layer 60 may be in contact with the recording coil or be embedded in the insulating layer 108 on the recording coil. The shape of the recording coil does not much matter. For the solenoidal coil of the embodiment as shown in the drawing, the thermal deformation-preventing layer 60 can be disposed on at least one of the lower coil 107 and the upper coil 115.

Figure 7:
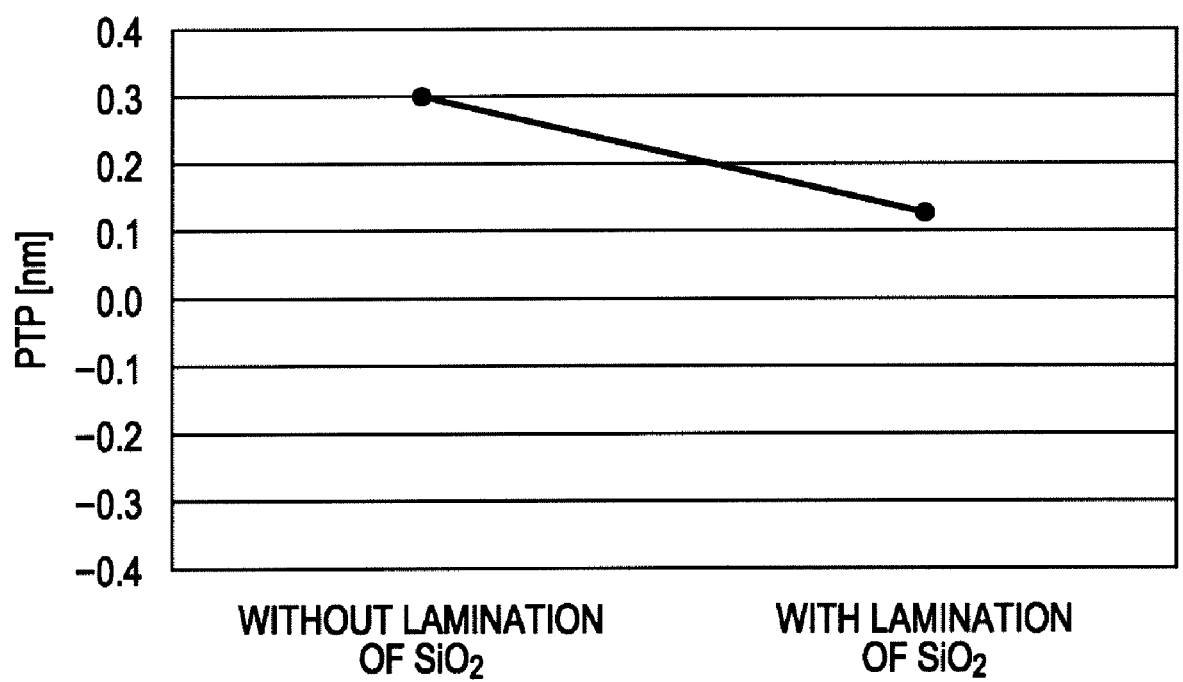
FIG. 7 is a graph showing the change in amount of protrusion of a recording and playback element toward a recording medium side depending on presence or absence of a thermal deformation-preventing layer.

FIG. 7 is a graph showing the change in amount of protrusion of a recording and playback element toward a recording medium M side depending on presence or absence of a thermal deformation-preventing layer 60 formed from $SiO_2$, that is, with lamination of $SiO_2$ or without lamination of $SiO_2$. With respect to thin film magnetic heads having the same configuration except that a thermal deformation-preventing layer 60 was present or absent, the amounts of protrusion were measured where the environmental temperature was changed from 25° C. to 60° C. and the medium-facing surface 100a of the slider 100 was assumed as a reference (the amount of protrusion was 0). As is also clear from FIG. 4, it is ascertained that when the thermal deformation-preventing layer 60 is disposed in the insulating protective layer 50, the amount of protrusion of the recording and playback element 10 toward the recording medium M side is reduced.

In the above described embodiments, the present invention is applied to the perpendicular magnetic recording head. However, the present invention can also be applied to a thin film magnetic head of longitudinal recording system, as a matter of course.

What is claimed is:

1. A thin film magnetic head comprising a recording and playback element, a lead conductor layer for feeding a power to the recording and playback element, an electrically conductive bump, which is disposed on a back-side end portion in the height direction of the lead conductor layer and which conductively connects the lead conductor layer to an electrode pad for external connection, and an insulating protective layer covering the recording and playback element and the lead conductor layer so as to fill between the recording and playback element and the electrically conductive bump,
    wherein a thermal deformation-preventing layer is composed of a material having a thermal expansion coefficient smaller than the thermal expansion coefficient of the insulating protective layer and is disposed in the insulating protective layer in such a way as to be disposed between a surface facing a recording medium and the electrically conductive bump without being exposed at the medium-facing surface,
    wherein the thermal deformation-preventing layer does not contact with the electrically conductive bump, and
    wherein the insulating protective layer is formed from $Al_2O_3$, and the thermal deformation-preventing layer is formed from $SiO_2$ or $ZrO_2$.

2. The thin film magnetic head according to claim 1, wherein the thermal deformation-preventing layer is disposed from the position of a layer above the recording and playback element to the position close to the electrically conductive bump in the height direction of the recording and playback element.

3. The thin film magnetic head according to claim 1, wherein the recording and playback element is provided with a main magnetic pole layer and a return yoke layer, which are opposed to each other with a magnetic gap layer therebetween on the medium-facing surface, and a recording coil for applying a recording magnetic field to the main magnetic pole layer, and the thermal deformation-preventing layer is disposed along the upper surface of the return yoke layer.

4. The thin film magnetic head according to claim 1, wherein the recording and playback element is provided with a main magnetic pole layer and a return yoke layer, which are opposed to each other with a magnetic gap layer therebetween on the medium-facing surface, and a recording coil for applying a recording magnetic field to the main magnetic pole layer, and the thermal deformation-preventing layer is disposed on a flat surface, the flat surface being flattened by both the return yoke layer and the insulating protective layer.

5. The thin film magnetic head according to claim 1,
    wherein the recording and playback element is provided with a lower shield layer and an upper shield layer opposed to each other with a predetermined distance therebetween, a multilayer film, which is disposed between the shield layers and which exerts a magnetoresistance effect, and an insulating layer on the upper shield layer, and
    wherein the thermal deformation-preventing layer is disposed between the upper shield layer and the insulating layer and is in contact with the upper shield layer.

6. The thin film magnetic head according to claim 1, wherein the recording and playback element is provided with a main magnetic pole layer and a return yoke layer, which are opposed to each other with a magnetic gap layer therebetween on the medium-facing surface, and a recording coil for applying a recording magnetic field to the main magnetic pole layer, and the thermal deformation-preventing layer is disposed between the recording coil and the main magnetic pole layer.

* * * * *